Oct. 28, 1952     R. G. LE TOURNEAU     2,615,542
CLUTCH AND BRAKE FOR STEERING VEHICLES

Filed July 28, 1947     3 Sheets-Sheet 1

INVENTOR.
R.G. LeTourneau
BY
ATTYS

Oct. 28, 1952 — R. G. LE TOURNEAU — 2,615,542
CLUTCH AND BRAKE FOR STEERING VEHICLES
Filed July 28, 1947 — 3 Sheets-Sheet 2

INVENTOR.
R. G. LeTourneau
BY
ATTYS

Oct. 28, 1952  R. G. LE TOURNEAU  2,615,542
CLUTCH AND BRAKE FOR STEERING VEHICLES
Filed July 28, 1947  3 Sheets-Sheet 3

INVENTOR.
R. G. Le Tourneau
BY
ATTYS

Patented Oct. 28, 1952

2,615,542

UNITED STATES PATENT OFFICE 2,615,542

CLUTCH AND BRAKE FOR STEERING VEHICLES

Robert G. Le Tourneau, Longview, Tex., assignor to R. G. Le Tourneau, Inc., Stockton, Calif., a corporation of California Application July 28, 1947, Serial No. 764,185

4 Claims. (Cl. 192—13)

This invention relates generally to a steering system for a motor vehicle.

In particular the invention is directed to, and it is an object to provide, a novel steering system for a motor vehicle which includes non-steerably mounted wheels on opposite sides thereof and a separately and individually controlled clutch corresponding to each side, so that disengagement of one clutch or the other releases the drive to the wheels on the corresponding side whereby continued drive of the wheels on the opposite side then causes the vehicle to turn laterally. While adaptable to many types of vehicles, this invention is especially useful on a four-wheel drive, rubber-tired tractor.

An additional object of the invention is to provide a vehicle steering system, as above, wherein the clutches are fluid pressure controlled; the system including a fluid conduit assembly and a selector valve arranged in said conduit assembly in controlling relation to the clutches.

A further object of the invention is to provide a vehicle steering system, of the type described, on a vehicle wherein the wheels on opposite sides thereof are fitted with fluid pressure controlled brakes; these brakes being interposed in another conduit assembly operative, by a brake valve, to normally cause application or release of the brakes on both sides simultaneously, but said selector valve being interposed in said other conduit assembly in a manner such that the brakes on the side adjacent the direction of turn may be applied, and those on the opposite side remain released, to obtain a shorter, quicker turn, when the vehicle is being steered by said clutch selector valve.

Another object of the invention is to provide a novel form of selector valve for the control of fluid pressure systems.

A further object of the invention is to provide a practical and convenient vehicle steering system, and one which will be exceedingly effective for the purpose for which it is designed.

These objects are accomplished by means of such structure and relative arrangement of parts as will fully appear by a perusal of the following specification and claims.

In the drawings.

Figure 1:
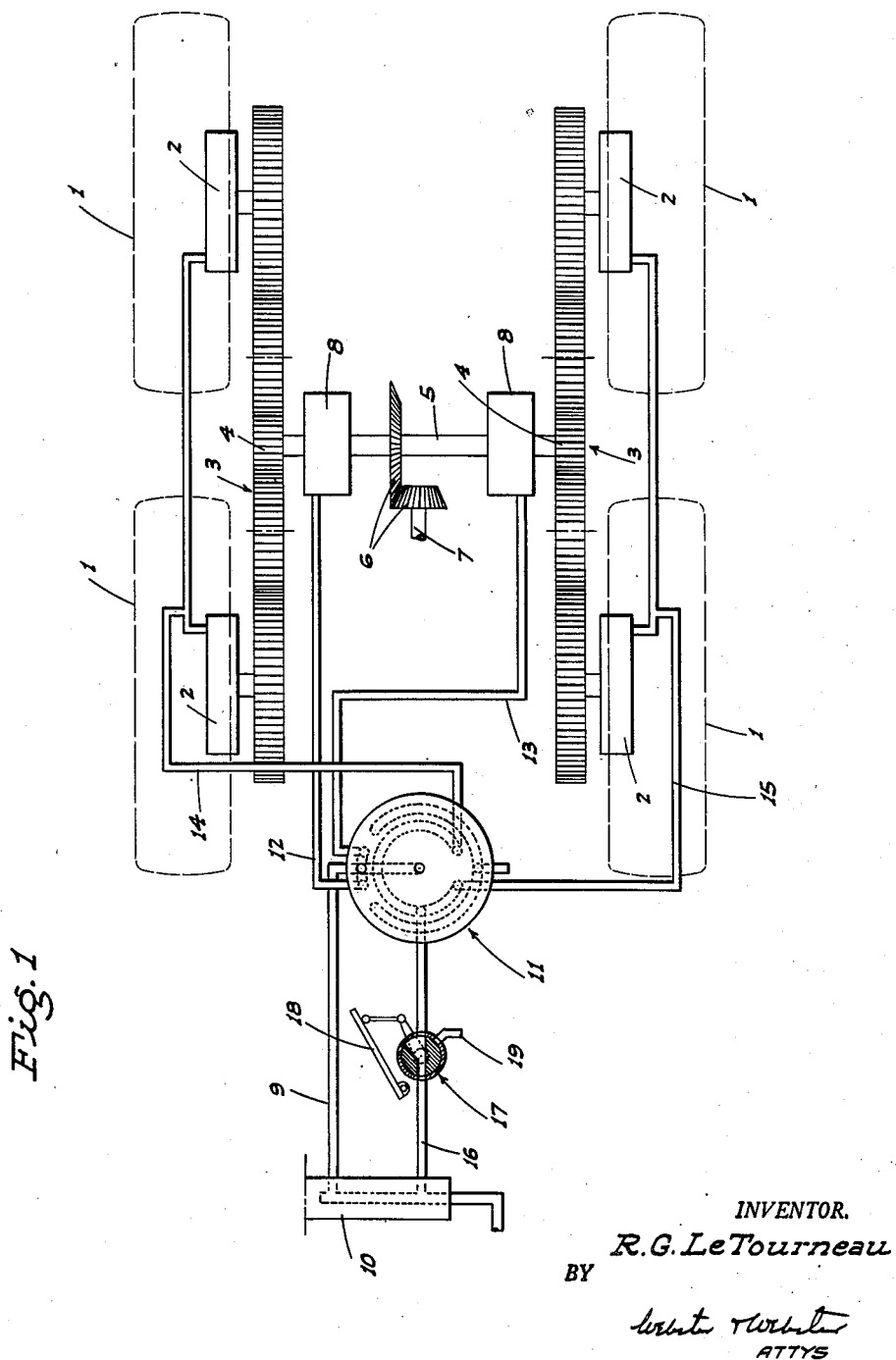
Fig. 1 is a diagrammatic plan of the system as applied to a four-wheel drive tractor.
Figure 3:
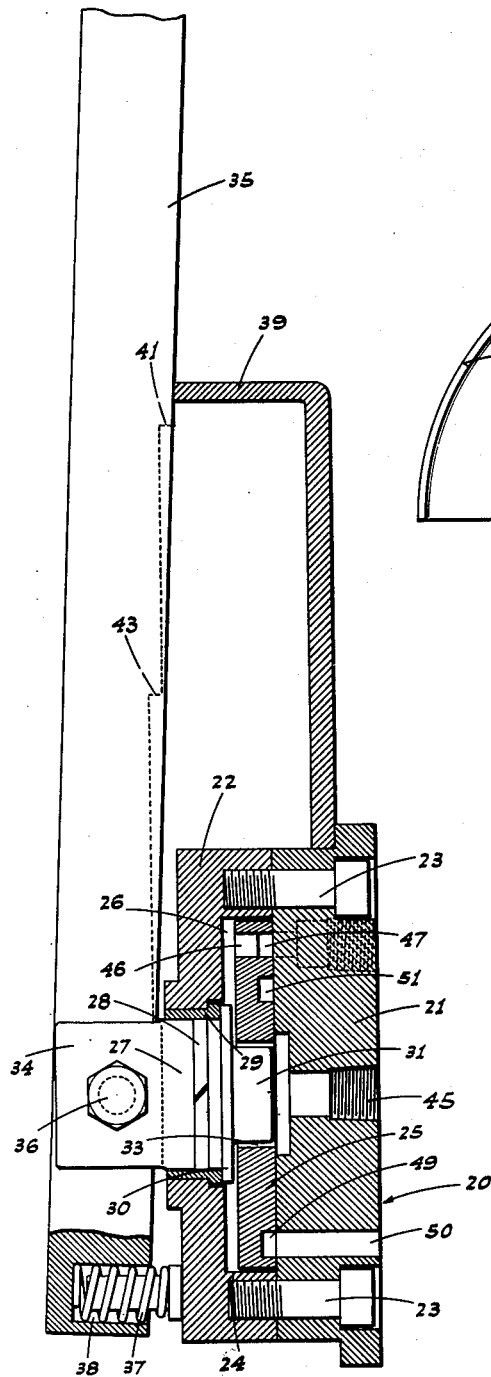
Fig. 3 is an enlarged cross section of the selector valve on line 3—3 of Fig. 2.

Referring now more particularly to the characters of reference on the drawings, and particularly at present to Fig. 1, the vehicle steering system is here shown diagrammatically as embodied in connection with a four-wheel tractor, which includes individually non-steerable wheels 1, each fitted with a fluid pressure controlled brake unit 2.

The wheels 1 on each side of the vehicle are driven by a gear train, each of which is indicated generally at 3; said gear trains embodying drive pinions 4 connected by a cross shaft 5. The cross shaft 5 is driven, intermediate its ends, by a bevel gear and pinion unit 6, which in turn is actuated by a drive shaft 7.

A pair of fluid pressure controlled clutches 8, here of pressure engaged, spring-released type, are interposed in the cross shaft 5 on opposite sides of the bevel gear and pinion unit 6, so that each of such clutches 8 corresponds to, and controls the operation of, one of the pinions 4. In other words, each clutch 8 controls the operation of a corresponding one of the gear trains 3 and the drive to the wheels on the corresponding side of the vehicle.

The clutches 8 are selectively and independently controlled through the medium of a conduit assembly which comprises a fluid pressure supply conduit 9 which leads from a pressure feed manifold 10 to a rotary disc valve, indicated generally at 11. Clutch control conduits 12 and 13 lead from the valve 11 to corresponding ones of the clutches 8.

The valve 11, whose structure and operation is hereinafter described in detail, is arranged so that it normally delivers fluid pressure to each of the clutch control conduits 12 and 13, whereby the clutches 8 are both engaged with the vehicle then driving straight ahead without lateral turning.

When it is desired to steer the vehicle laterally toward one side or the other, the valve 11 is manipulated in a manner to cause venting or exhaust of the fluid pressure from one clutch 8, while retaining the fluid pressure on the other clutch. When this occurs such one clutch disengages, which in turn disconnects the drive to the wheels 1 on the corresponding side of the vehicle. As the other clutch 8 remains engaged, its corresponding wheels 1 continue to drive, thus causing turning of the vehicle laterally in the opposite direction; i. e. laterally from the side corresponding to said disengaged clutch 8.

The brake units 2 are interposed in another conduit assembly, for the control of such brake units, in the following manner:

Said other conduit assembly comprises brake control conduits 14 and 15 branched, as shown, and leading to connection in parallel with the brake units 2 on corresponding sides of the vehicle.

In the present embodiments the brake units 2 are spring engaged and fluid pressure released. Thus, upon introduction of fluid pressure into the brake control conduits 14 and 15, the brake units 2 are released, which is their normal condition. Fluid pressure is normally maintained in the conduits 14 and 15 from a supply conduit 16 which leads from the manifold 10 to the valve 11; the latter being arranged to normally deliver the fluid pressure to both of said brake control conduits 14 and 15.

To normally apply the brake units 2, the brake control conduits 14 and 15 are simultaneously vented or exhausted, this being accomplished by a two-way valve 17 interposed in the supply conduit 16, and arranged to be actuated by a foot pedal 18 in the operator's compartment of the vehicle. The valve 17 is of rotary plug-type, and in its normal position permits of free fluid pressure flow through the conduit 16. However, upon depression of the pedal 18 the valve 17 is rotated so as to cut off fluid pressure supply flow in the conduit 16, ahead of the valve 17, and at the same time exhausts the conduit 16 between said valve 17 and the valve 11; the exhausting pressure escaping through a vent conduit 19. Thus, normally the depression of pedal 18 applies the brake units 2 on both sides of the vehicle.

However, when the valve 11 is in position to cause disengagement of one clutch 8 or the other, for the purpose of steering the vehicle laterally from the corresponding side thereof, said valve 11 will permit only of venting and engagement of the brake units 2 corresponding to the wheels 1 on the side corresponding to the disengaged clutch. Thus, under these conditions depression of the pedal 18 will cause engagement of only the brake units 2 on the side of the vehicle corresponding to the direction of turn, whereby to accelerate such turn and permit the vehicle to turn on a shorter radius than otherwise possible.

The above described vehicle steering system is therefore operative to accomplish steering of the vehicle toward one side or the other by disengagement of the drive to the wheels on the same side of the vehicle with the brakes wholly released, or by disengagement of the drive on said same side of the vehicle and simultaneous application of the brakes on said side to accelerate the turn and make possible turning on a shorter radius.

The rotary disc valve 11, as employed in the system for the accomplishment of steering, as above, is constructed in the manner shown in detail in Figs. 2–6, inclusive, and a description of such valve now follows.

The valve housing is indicated generally at 20, and comprises initially separate bodies 21 and 22 secured together, in face to face relation, by cap screws 23. The body 22 is formed with a circular recess 24 on the side adjacent the body 21.

A disc type, rotary valve 25 is disposed in the recess 24 and bears in face to face engagement with the adjacent surface of the body 21; the engaged faces being ground for substantially perfect matching engagement. The rotary valve 25 is of lesser axial extent than the depth of the circular recess 24, whereby to form a fluid pressure chamber 26 between the body 22 and adjacent face of said rotary valve disc 25.

A rotatable, but axially immovable, spindle 27 is journaled centrally in the body 22, and includes a fluid pressure seal 28 running in cooperation with a bushing 29. A radial shoulder 30 prevents escape of the spindle 27 from the body 22.

At its inner end the spindle 27 is formed with a rectangular boss 31 which seats in matching relation in a generally rectangular central bore 32 in the rotary valve disc 25. The sides of the generally rectangular bore 32 are relieved, intermediate the corners thereof, as at 33, to permit of fluid pressure transfer through the valve disc 25 along the boss 31, for the purpose hereinafter described.

At its outer end the spindle 27 is formed with a slotted neck 34, through which the lower end portion of a hand lever 35 extends; the lever 35 being pivoted, in the slotted neck 34, for lateral swinging movement, by means of a cross bolt 36. The cross bolt 36 extends through the lever 35 short of the lower end of the latter, and a compression spring unit 37 engages at one end against the body 22 and bears at the other end in a socket 38 in the lever 35, normally urging the latter in a direction bearing against a stepped quadrant 39 fixed on, and projecting above, the valve housing 20.

Figure 2:
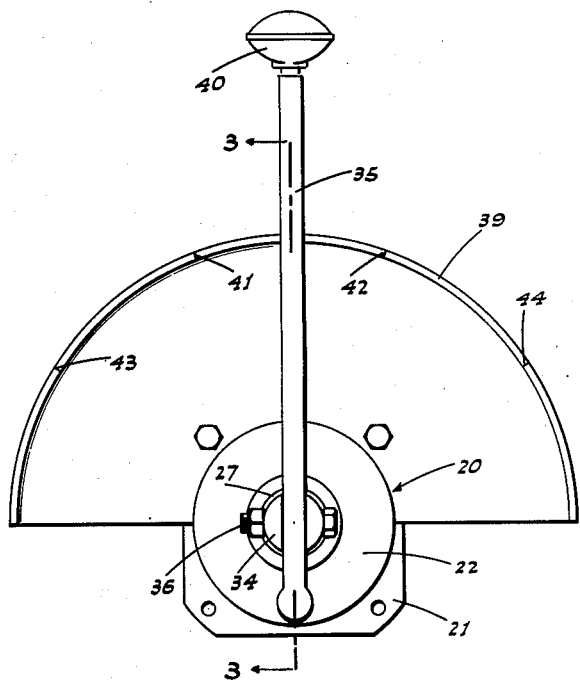
Fig. 2 is an end view of the selector valve, detached.
Figure 4:
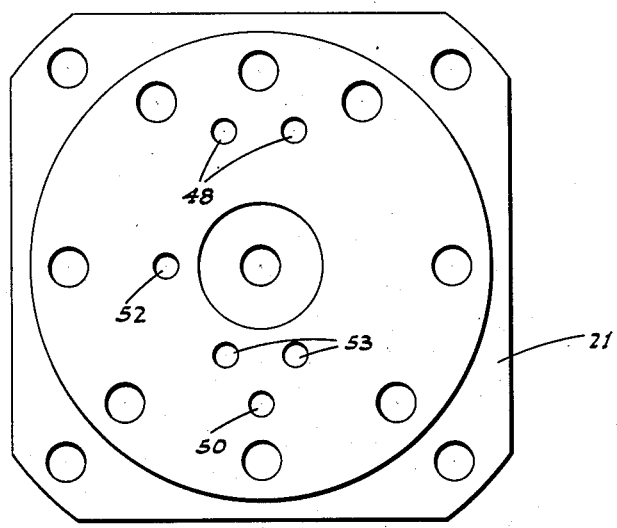
Fig. 4 is an elevation of the ported half of the valve housing, detached.
Figure 5:
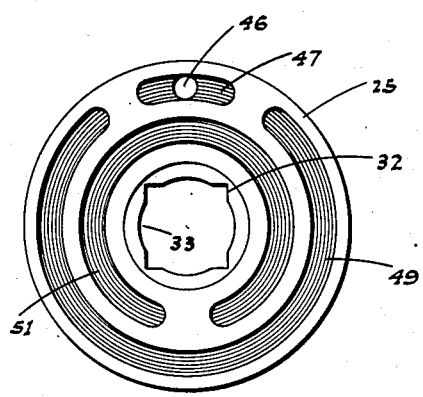
Fig. 5 is an elevation of the channeled face of the rotary disc of the valve.

The normal position of the hand lever 35, which includes a handknob 40 at its upper end, is substantially vertical, as in Fig. 2; the quadrant 39 including steps or stops 41 and 42 on opposite sides of the normal position of the lever 35, and other steps or stops 43 and 44 beyond the stops 41 and 42, respectively.

When the hand lever 35 is urged in one direction or the other, it will normally engage and be limited in movement by either the stop 41 or 42. However, by then shifting the hand lever laterally against the compression of the spring unit 37, such lever may be moved further to engage either the stop 43 or 44.

Shifting the hand lever 35 in the manner above described, rotates the valve disc 25 to control fluid pressure flow in the conduits to which the valve 11 is connected.

Centrally thereof the body 21 is formed with a fluid pressure intake port 45 which communicates with the generally rectangular bore 32 so that fluid pressure delivered into the port 45 may flow through the relieved portions 33 of the bore 32 along the boss 31. This pressure then travels between the radial shoulder 30 and the adjacent face of the valve disc 25 between which there is some clearance, and the pressure then enters the chamber 26.

A port 46 extends through the valve disc 25 adjacent its periphery, to establish communication between the fluid pressure chamber 26 on one side of said valve disc 25, and a relatively short arcuate channel 47 on the opposite side thereof. The port 46 enters the channel 47 centrally of its ends, and said relatively short arcuate channel 47 normally registers with a pair of adjacent but circumferentially spaced-apart ports 48 in the body 21.

The channel 47 is formed in what may be termed the working face of the valve disc 25, and said face includes, on the same radius, another arcuate channel 49 terminating adjacent but short of corresponding ends of the channel 47.

Generally opposite the ports 48 the body 21 is formed with another port 50 therethrough; the port 50 always registering with the channel 49.

The above described arrangement of ports 48 and 50, together with the channels 47 and 49, provides the clutch control portion of the valve 11.

The supply conduit 9 is connected to the intake port 45, while the clutch control conduits 12 and 13 are connected to corresponding ones of the ports 48. The normal position of the valve disc 25, in relation to the ports 48 and 50, is represented by Illustration A of Fig. 6.

Figure 6:
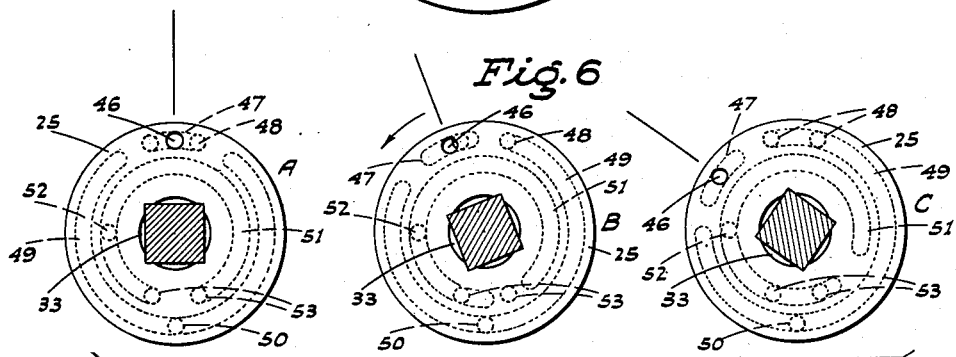
Fig. 6 is a diagrammatic illustration showing one sequence of positions of the selector valve.

When the hand lever 35 is shifted to engage the stop 41, per Illustration B of Fig. 6, the relatively short arcuate channel 47 then registers with only one of the ports 48, with the other of said ports 48 then in communication with the arcuate channel 49. The result is the continuance of fluid pressure feed from chamber 26 through port 46 and channel 47 to the clutch control conduit 12.

The corresponding clutch 8 thus remains engaged, but the other is disengaged for the reason that clutch control conduit 13 is then in communication, through the corresponding port 48, with the arcuate channel 49 which exhausts through the port 50. The result is steering of the vehicle laterally in one direction. To steer the vehicle in the opposite direction, the hand lever 35 is shifted, from its normal upstanding position, in the opposite direction, i. e. into engagement with the stop 42. Thus, to steer the vehicle in one direction or the other requires only the simple shifting of hand lever 35 into engagement with stop 41 or stop 42.

The channels 47 and 49, being on the same radius, are concentric to the axis of the valve disc 25, and surround a third arcuate channel 51, likewise concentric and of substantial circumferential extent, but slightly less than 360°. The arcuate channel 51 terminates, at its ends, in spaced-apart relation, generally opposite, on the valve disc 25, from the arcuate channel 47.

A port 52, through the body 21, registers with the arcuate channel 51 in all rotative positions of the valve disc 25, and in turn the end portions of said channel 51 normally register with corresponding ones of a pair of ports 53 through the body 21. The arcuate channel 51, together with the ports 52 and 53, are the brake control arrangement of the valve 11.

The supply conduit 16 connects to the port 52, while the brake control conduits 14 and 15 lead to corresponding ones of the ports 53.

When the valve disc 25 is in its normal position, as per Illustration A of Fig. 6, fluid pressure flows from the supply conduit 16, through the port 52, into channel 51, through both ports 53, to the conduits 14 and 15, applying pressure to all of the brake units 2, and holding the latter disengaged.

However, when the hand lever 35 is shifted in engagement with the stop 41 to cause disengagement of one of the clutches 8 for the purpose of steering in a corresponding direction, the valve disc 25 is shifted to a position such that the arcuate channel 51 remains in register with only a corresponding one of the ports 53, as per Illustration B of Fig. 6; the other port 53 then being entirely closed off, and the brakes on the corresponding side of the vehicle remaining fluid pressure released. In this position of the parts, and as the vehicle starts to turn, the operator depresses the pedal 18, breaking the supply conduit 16, and venting said conduit between the valve 17 and the valve 11. When this occurs the brake units 2 on the side of the vehicle corresponding to the then disengaged clutch are exhausted and immediately apply, accelerating the turning of the vehicle; the extent of application of the brakes being controlled by the pedal 18.

When a turn is made in the opposite direction, with hand lever 35 against stop 42, the same result is obtained, but with the other clutch 8 and corresponding brake units 2.

When it is desired to disengage both of the clutches simultaneously, the lever 35 is swung laterally sufficient to clear stop 41 or 42, and is then urged into engagement with stop 43 or 44. In either such position of the hand lever 35, the relatively short arcuate channel 47 is moved to a position in wholly clearance relation to the ports 48, both of the latter then being in communication with the exhaust channel 49, so that the fluid pressure from both clutches exhausts through the port 50, permitting said clutches to open, as shown, for example, in Illustration C of Fig. 6. In either of such clutch releasing positions of the hand lever 35, the two ports 53 are both in communication with one end portion of the fluid pressure supply channel 51, maintaining the brake units 2, on both sides of the vehicle, released, but subject to simultaneous setting by depression of the pedal 18, which would shut off conduit 16 and exhaust the pressure from both conduits 14 and 15 through the vent 19. It is thus possible to disengage both of the clutches 8, while retaining the ability to set the brake units on both sides of the equipment simultaneously.

It should be noted, as a valuable feature of the valve 11, that the fluid pressure in chamber 26 assures positive seating of the working face of the valve disc 25 against the corresponding face of the ported body 21, so as to prevent pressure leakage between channels 47, 49, and 51.

The described steering system, with its fluid pressure control, is adapted principally for use with air pressure, although the invention is not limited thereto.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful and upon which Letters Patent are desired:

1. In combination with a vehicle which includes traction members on each side thereof, a driven shaft connected in driving relation with said members, said driven shaft including a pair of fluid pressure applied clutches, a source of fluid under pressure, a valve, a single operating lever connected with and effective to operate such valve, the valve being provided with an inlet port and an exhaust port, a conduit leading from the source of fluid to said inlet port, a separate conduit leading from the valve to each clutch, the valve being provided with a port in communication with said inlet port and lying in communication with both of the clutch conduits in one position of the lever, the valve being responsive to movement of the lever in one direction to move said last named port out of communication with one of the clutch conduits and open communication between said last named clutch conduit and the exhaust port; fluid pressure released brakes on the traction members, the valve being provided with a second inlet port, a conduit leading from the fluid source to the second inlet port, a conduit leading from each of the brakes to the valve, the valve being provided with a port in communication with the second inlet port and lying in communication with both brake conduits when the lever is in said one position, said valve being responsive to the movement of said lever in said one direction from said first position to move the port, which is in communication with the second inlet port, out of communication with one of the brake conduits, and a separate valve means operative to then vent the other brake conduit to atmosphere.

2. A combination as in claim 1 in which the valve is responsive to the said further movement of the lever in the same one direction, to move the port which is in communication with the second inlet port again into communication with the said one brake conduit, the second valve means being then operative to vent both brake conduits to atmosphere.

3. A combination as in claim 1 in which the separate valve means comprises a valve disposed in the conduit leading from the fluid source to the second inlet and said last named valve being operative to close the last named conduit on the source side of the valve and open it to atmosphere on the other side of said valve.

4. In combination with a vehicle which includes traction members on each side thereof, a driven shaft connected in driving relation with said members and comprising a pair of fluid pressure applied clutches, two pairs of fluid pressure operated brakes on said traction members; a source of fluid under pressure, a brake valve, a control valve, a single operating lever connected with and effective to operate said control valve, said control valve being provided with: an exhaust port, first and second inlet ports, and ports and conduit connections to each of said clutches and brakes; said first inlet port having a conduit direct to said source of fluid pressure, a conduit which includes said brake valve connecting said second inlet port to said source, said lever having a normal position, a right steer position and a left steer position; said control valve ports being arranged so that with said lever in the normal position, communication will be established from said brake valve to the brakes and from said source of fluid pressure to the clutches; with said lever in the right steer position communication will be cut off between the brake valve and the right pair of brakes by the control valve in such a manner that the right pair of brakes remain under fluid pressure and communication is established from the left pair of brakes to exhaust by actuation of the brake valve, and communication will also be established from said source to one of said clutches and from the other of said clutches to exhaust; and with said lever in the left steer position communication will be cut off between the brake valve and the left pair of brakes by the control valve in such a manner that the left pair of brakes remain under fluid pressure and communication is established from the right pair of brakes to exhaust by actuation of the brake valve, and communication will also be established from said source to the other of said clutches and from one of said clutches to exhaust.

ROBERT G. LE TOURNEAU.

REFERENCES CITED

The following references are of record in the file of this patent:

UNITED STATES PATENTS

| Number | Name | Date |
|---|---|---|
| 1,505,533 | Blackmore | Aug. 19, 1924 |
| 1,566,111 | Miller | Dec. 15, 1925 |
| 2,023,597 | Klocke et al. | Dec. 10, 1935 |
| 2,233,192 | Armington | Feb. 25, 1941 |
| 2,291,241 | Lawrence | July 28, 1942 |
| 2,328,606 | Boldt | Sept. 7, 1943 |
| 2,329,742 | Bush et al. | Sept. 21, 1943 |
| 2,351,098 | Boldt | June 13, 1944 |
| 2,372,311 | Brown | Mar. 27, 1945 |
| 2,380,619 | Terrill | July 31, 1945 |
| 2,384,182 | Lewis | Sept. 4, 1945 |
| 2,393,324 | Joy | June 22, 1946 |